United States Patent

Urevig et al.

[11] Patent Number: 6,154,787
[45] Date of Patent: Nov. 28, 2000

[54] GROUPING SHARED RESOURCES INTO ONE OR MORE POOLS AND AUTOMATICALLY RE-ASSIGNING SHARED RESOURCES FROM WHERE THEY ARE NOT CURRENTLY NEEDED TO WHERE THEY ARE NEEDED

[75] Inventors: Paul D. Urevig, Champlin; James R. Malnati, Stillwater; Donald J. Ethen, New Brighton; Herbert L. Weber, White Bear Lake, all of Minn.

[73] Assignee: Unisys Corporation, Blue Bell, Pa.

[21] Appl. No.: 09/010,099

[22] Filed: Jan. 21, 1998

[51] Int. Cl.⁷ .................................................. G06F 13/14
[52] U.S. Cl. .................. 710/8; 709/5; 709/223; 709/226; 709/249
[58] Field of Search ........................... 710/8; 709/5, 223, 709/226, 249

[56] References Cited

U.S. PATENT DOCUMENTS

| | | | |
|---|---|---|---|
| 5,008,853 | 4/1991 | Bly et al. | 364/900 |
| 5,018,060 | 5/1991 | Gelb et al. | 707/205 |
| 5,093,913 | 3/1992 | Bishop et al. | 711/152 |
| 5,228,137 | 7/1993 | Kleinerman et al. | 395/500 |
| 5,315,711 | 5/1994 | Barone et al. | 395/275 |
| 5,347,646 | 9/1994 | Hirosawa et al. | 395/575 |
| 5,467,467 | 11/1995 | Ozawa | 395/185.08 |
| 5,625,795 | 4/1997 | Sakakura et al. | 395/475 |
| 5,675,797 | 10/1997 | Chung et al. | 709/104 |
| 5,694,541 | 12/1997 | Service et al. | 395/183.22 |
| 5,717,856 | 2/1998 | Carleton et al. | 395/200.04 |
| 5,826,239 | 10/1998 | Du et al. | 705/8 |
| 5,889,956 | 3/1999 | Hauser et al. | 709/226 |
| 5,898,883 | 4/1999 | Fujii et al. | 711/147 |
| 5,996,013 | 11/1999 | Delp et al. | 709/226 |
| 6,009,275 | 12/1999 | Dekoning et al. | 395/727 |

Primary Examiner—Thomas C. Lee
Assistant Examiner—Abdelmoniem Elamin
Attorney, Agent, or Firm—Charles A. Johnson; Mark T. Starr; Nawrocki, Rooney & Silverston, P.A.

[57] ABSTRACT

Method and apparatus for providing a timely, automated re-assignment of resources, such as peripheral devices, memory, and/or processing capacity, among a number of host data processing systems. In a preferred embodiment, the present invention allows peripheral devices, such as tape drives, to be configured as shareable units, and accessed by any participating host data processing system as the need arises. The invention preferably includes a central coordinating facility, which evaluates the device status information gathered, from each participating host data processing system. The device status information is used to determine which host data processing systems have free devices available for use. Within these constraints, the invention automatically orchestrates the re-assignment of selected peripheral devices from where they are not currently needed to where they are needed, with little or no operator interaction.

50 Claims, 6 Drawing Sheets

GROUPING SHARED RESOURCES INTO ONE OR MORE POOLS AND AUTOMATICALLY RE-ASSIGNING SHARED RESOURCES FROM WHERE THEY ARE NOT CURRENTLY NEEDED TO WHERE THEY ARE NEEDED

BACKGROUND OF THE INVENTION

1. Cross References to Co-Pending Applications

This patent application is related to U.S. patent application Ser. No. 08/521,003, now U.S. Pat. No. 5,764,974 entitled, "A SYSTEM WITH USER SPECIFIED PATTERN DEFINITIONS FOR MATCHING INPUT MESSAGES AND ASSOCIATED DECISIONS FOR CONDITIONALLY RESPONDING TO THE INPUT MESSAGES," filed on Aug. 30, 1995, and U.S. patent application Ser. No. 08/521,203, now U.S. Pat. No. 5,754,239 entitled, "APPARATUS AND METHOD FOR MESSAGE MATCHING USING PATTERN DECISIONS IN A MESSAGE MATCHING AND AUTOMATIC RESPONSE SYSTEM," filed on Aug. 30, 1995, both of which are incorporated herein by reference.

2. Field of the Invention

This invention relates to sharing resources between computer systems, and more particularly to a method and apparatus for allocating peripheral devices between autonomous computer systems.

3. Description of the Prior Art

The prior art may be best understood by way of explanation of prior systems for automating the operation of data processing systems because that is the context in which the present invention is preferably utilized.

Data processing systems, such as the 2200 Series data processing systems from Unisys Corporation, have historically required human interaction for exerting control over the day-to-day operations of the system. Operator/system interfaces have included an operations console coupled to a system console port via a communications network interface. One such operations console is disclosed in U.S. Pat. No. 5,315,711 issued to Barone et al. In Barone et al., display manager software provides display services for the application programs running on the console. Tasks performed at the operations console include: system booting, system configuration, job scheduling, file management, and responding to exception conditions and alarms.

In many systems, a common form of interaction between the operator and the system is to have the control software of the data processing system (e.g., the operating system) transmit character-based informational messages to the operation console (e.g., a Video Display Terminal) for viewing by the operator. Based on the particular message displayed at the operation console, the operator may respond with an answer as input or initiate execution of a system command.

One drawback to the above form of operator/system interaction is that many of the system messages, as well as the format for the commands and responses, are cryptic. While a highly experienced operator might well know the appropriate steps to take (proper commands and or responses) in response to a given message or set of messages, an inexperienced operator may have to seek help or might mistakenly take inappropriate actions. An inappropriate response could lead to catastrophic consequences (e.g., system or subsystem shutdown).

Another disadvantage to the above form of operator/system interaction is the possibility of operator error. For example, a harried or distracted operator might miskey a response or system command. Once again the cost of the mistake might be exorbitant.

Therefore, it would be desirable to decrease operator interaction to reduce the cost of operating data processing system and to reduce the likelihood of costly errors. Various tools have been provided for automating data processing system operation. One such tool is the Smart Console software suite that operates in the operating environment of the 2200 Series systems.

Functionally, the purpose of Smart Console is to partially automate the operations of data processing systems. Software was constructed to execute on a micro-computer which was dedicated for use as an operation console. The console was programmed to receive messages from the system, search an operator defined database of pattern definitions for a pattern definition that matched the messages, and perform a user specified function which was associated with a matching pattern definition. Example functions that could be specified included operator commands, answers to questions presented in messages from the system to the operator, and directives to various alarm units. While not fully automating the operation of data processing systems, the Smart Console software provided some automation functions.

Many data processing environments, such as those discussed above, have shared device configurations, to reduce costs by sharing common equipment between multiple systems. As an example, instead of purchasing the maximum number of resources needed for all data processing systems within a data processing complex, a defined set of sharable resources (otherwise known as resource pools) can be shared among data processing systems within a data processing complex. This scheme of resource pooling allows peripheral devices such as tape drives to be allocated when they are needed, and where they are needed.

Shared device configurations for multiple autonomous data processing systems can be more complex when re-assigning a resource from one system to another, since a computer operator may be required to manually un-assign a resource on a first system, then re-assign the peripheral device on a second system. As described above, operator interaction on a complex task such as movement of resources such as peripheral devices between multiple autonomous data processing systems may increase the likelihood of costly errors.

SUMMARY OF THE INVENTION

The present invention overcomes many of the disadvantages associated with the prior art by providing a method and apparatus for providing a timely, automated re-assignment of resources, such as peripheral devices, memory, and/or processing capacity, among a number of host data processing systems of a data processing complex. Preferably, a data processing complex includes two or more data processing systems coupled to a communications network. The present invention allows resources such as peripheral devices, to be configured as shareable units, and accessed by any host data processing system as the need arises. The invention preferably includes a central coordinating facility, which evaluates the device status information gathered from each participating host data processing system. The device status information is used to determine which host data processing systems have free peripheral devices available for use. Within these constraints, the invention automatically orchestrates the re-assignment of selected peripheral devices from where they are not currently needed to where they are needed, with little or no operator interaction.

Instead of purchasing the maximum number of tape drives needed for all systems, resources can be allocated when they are needed, and where they are needed. This saves operators from involving themselves with the process, freeing them up for other tasks. Its also saves equipment costs and allows for optimal usage of resources. Finally, manual keyins and procedures for the re-assignment of tape drives and procedures are typically slow and error prone. The present invention can perform these operations quickly and automatically, with little chance for error.

In a preferred embodiment of the present invention, when an executing task on a Unisys 2200 host system requires a tape drive, cross system automation informs a Shared Tape Drive Manager (STDM) Unix shell script of this need. STDM then probes other participating 2200 systems within the data processing complex, to determine which tape drives are currently available. Available drives are chosen from a pool of participating resources which may be un-assigned on one system and assigned on another. Entire systems and tape drives may be excluded from this pool, and more than one pool may exist. Within these constraints, STDM orchestrates the re-assignment of tape drives from where they are not currently needed to wherever there is a need. In essence, STDM automatically takes the actions a typical operator would have to take in performing a dynamic shared tape drive re-assignment from one system to another.

In a preferred embodiment of the present invention, the cross system automation component includes the Single Point Autoaction Message System (SP-AMS), available from Unisys Corporation, which allows batch or demand runs on the host data processing system to send messages to a Single Point Operations (SPO) Console. The SPO console monitors and controls multiple computer systems from a single graphical display. A message automation facility within the SPO Console processes incoming messages through a set of rules contained in a database of message patterns and corresponding actions. Incoming resource requests sent to the SPO Console through SP-AMS are recognized by the message automation facility, and the STDM (running in a SPO telnet session) is notified of the request for additional resource. STDM then identifies available tape drives, and sends a message to the source host data processing system currently holding the identified tape drive to re-assign the tape drive. After the tape drive is un-assigned on the source host data processing system, STDM then instructs the requesting host data processing system to take assignment of the tape drive.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The detailed descriptions which follow are presented largely in terms of algorithms and symbolic representations of operations of data bits within a computer memory. These algorithmic descriptions and representations are the means used by those skilled in the data processing arts to most effectively convey the substance of their work to others skilled in the art.

An algorithm is here, generally, conceived to be an self-consistent sequence of steps leading to a desired result. These steps are those requiring physical manipulations of physical qualities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer system or other apparatus. In particular, various general purpose computer systems may be used with computer programs written in accordance with the teachings of the present invention, or it may prove more convenient to construct more specialized apparatus, to perform the required method steps. This required structure for such machines will be apparent from the description given below.

In sum, the present invention preferably is implemented for practice by a computer, e.g., a source code expression of the present invention is input to the computer to control operations therein. It is contemplated that a number of source code expressions, in one of many computer languages, could be utilized to implement the present invention. A variety of computer systems can be used to practice the present invention, including, for example, a personal computer, an engineering work station, an enterprise server, etc. The present invention, however, is not limited to practice on any one particular computer system, and the selection of a particular computer system can be made for many reasons.

Figure 1:
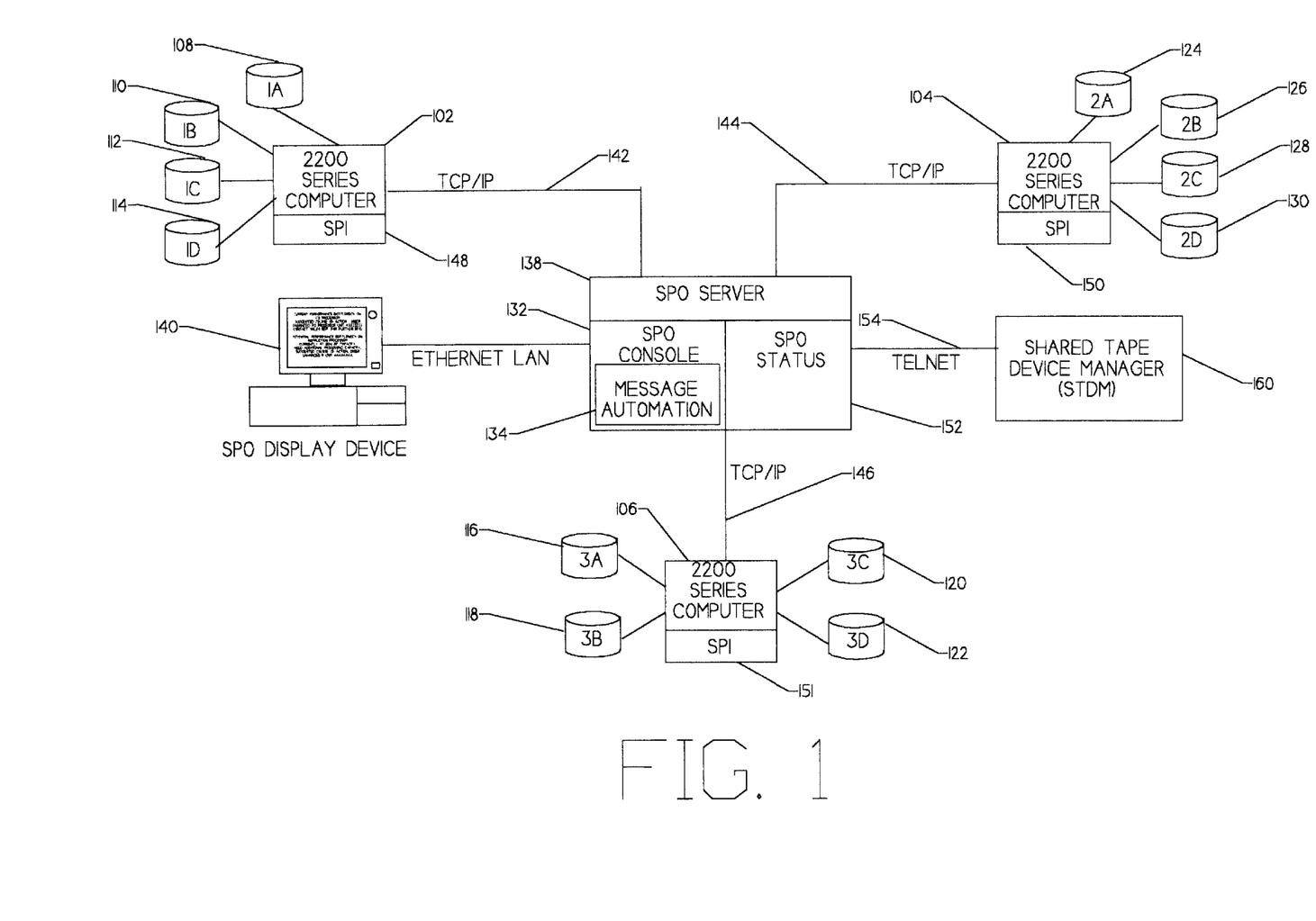
FIG. 1 is a block diagram of the computer-based environment of the present invention.

FIG. 1 is a block diagram of the computer-based environment of the present invention. In this preferred embodiment, a data processing complex having one or more networked data processing systems 102, 104 and 106 is shown. In this illustrative environment, the data processing systems 102, 104 and 106 are 2200 series computers available commercially from Unisys Corporation. It is contemplated that automated management of peripheral devices shown by the present invention can also be implemented in any data processing complex, including those where data processing systems from several different manufacturers are employed, or when the data processing systems are from a common manufacturer.

Each data processing system 102, 104 and 106 within the data processing complex possesses one or more peripheral devices 108, 110, 112, 114, 116, 118, 120, 122, 124, 126, 128 and 130. Peripheral devices 108, 110, 112, 114, 116, 118, 120, 122, 124, 126, 128 and 130 come in many different device classes. Each device class may contain many different species. Peripheral device classes can include, but are not limited to, tape drives, printers, fixed mass storage devices, optical drives, communications devices, plotters and scanners. As an illustrative example, the device class of tape drives can include species such as open reel tapes and cartridge tapes.

Preferably, the Unisys Single Point Operations (SPO) Console 132, available from Unisys Corporation, is used to monitor and control multiple computer systems 102, 104 and 106 from a single graphical display 140. A method and apparatus for remotely and centrally controlling a plurality of host processors is disclosed in U.S. Pat. No. 5,315,711, issued to Barone et al., which is incorporated herein by reference. The SPO Console 132 combines automation (ensures routine tasks are always performed, minimizes operator-system interaction, and reduces operational errors) and centralization (allows one operator to monitor and control an entire network of computer systems). The operator uses the SPO Console display 140 to monitor the state of all computer systems 102, 104 and 106, handle exception conditions, and take complete control of any system, local or remote. Behind the scenes, agents automatically monitor the status of hardware and software components, while message automation 134 takes care of routine operational functions. Automated actions handled by the SPO console 132 can be as simple as generating an alarm, or, in accordance with the present invention, can be a sequence of actions spanning multiple systems.

The SPO Console 132 runs on a UNIX system (the SPO Server) 138 and uses large screen X terminals or PC terminals for display 140. Preferred embodiments for the SPO Server 138 include an Aquanta server running UnixWare, a U6000 server running SVR4, or a Sun SPARC server running Solaris. The SPO Server 138 communicates with each managed host system 102, 104 and 106 via TCP/IP LAN-based connections 142, 144, and 146. Single Point Interface (SPI) software 148, 150, and 151 runs on each managed computer system 102, 104 and 106, providing the interface between that system and the SPO Console 132. Fully redundant configurations with multiple SPO servers 138 and hot standby switchover ensure that SPO Console 132 is not a single point of failure.

The SPO display device (graphical interface) 140 provides a high-level view of the current states of all connected systems and the hardware and software components on those systems. Lower level displays provide the direct control of each system.

Single Point Status (SP Status) 152 is a feature found within SPO used to create custom status displays of physical and logical components across multiple systems. Groups of components like disks, tapes, jobs, critical messages, or any other components whose attributes are of interest, are represented by an icon. SP Status 152 allows logical and physical components to be grouped under icons in a variety of ways. One common approach is to group together similar types of objects across multiple systems. For example, there might be icons that represent all disks within the data center, all the shared disks, critical files systems, etc.

As mentioned earlier, the SPO Console 132 includes a message automation function 134 which plays three key roles: 1) it automatically handles most of the operator messages received from the managed systems, so an operator no longer has to deal with them; 2) for messages that are not automatically handled and do require operator action, it generates an alert to inform the operator and to ensure the condition is not missed, wherein the alerts can drive external alarm devices such as pagers, flashing lights, send E-mail, etc; and 3) it extracts data from operator messages and uses the data to drive the SPO Console 132 and SP Status graphical displays 140.

TELNET based connections 154 can be used to connect various system types to the SPO Console 132 for which direct console access is not available, as well as to monitor specific applications running on connected systems.

Under the present invention, a shared device manager works in conjunction with the SPO Console 132, described above, to allow peripheral devices 108, 110, 112, 114, 116, 118, 120, 122, 124, 126, 128 and 130, configured as shareable units, to be accessed by any data processing system 102, 104 and 106 as the need arises. In a preferred embodiment, the Shared Tape Drive Manager (STDM) 160 manages tape drive resources 108, 110, 112, 114, 116, 118, 120, 122, 124, 126, 128 and 130 by organizing them into tape pools. Within these tape pools, data processing systems 102, 104, and 106 and their corresponding drives 108, 110, 112, 114, 116, 118, 120, 122, 124, 126, 128 and 130 are grouped according to accessibility, drive type, and tape access. STDM 160 is a central coordinating facility, which evaluates the drive status information gathered from each participating system 102, 104 and 106. This information is used to determine which system(s) have free drives available for use. STDM 160 uses this information to request the appropriate reconfiguration of the shared tape drives between systems. Rather than purchasing the maximum number of tape drives needed for all data processing systems within the data processing complex, resources can be allocated when they are needed and where they are needed. This saves operators from involving themselves with the process, freeing them up to perform other tasks. It also saves equipment costs and allows for optimal usage of resources.

The controlling STDM Unix script 160 executes in a read-only SPO TELNET session 154, which is automatically logged into the SPO server 138 and waiting for input. The SP Status application 152 is used to represent which tape drives are currently assigned to each system. An object-oriented display 140 is dynamically updated to reflect the current drive allocation.

The central concept of STDM 160 is that when a data processing system (such as a 2200 host system) 102, 104 or 106 requires a tape drive 108, 110, 112, 114, 116, 118, 120, 122, 124, 126, 128 or 130, cross-system automation informs the STDM Unix shell script 160 of this request. The data processing system (Unisys 2200) 102, 104 or 106 may use several different methods to inform STDM 160 that a tape drive 108 108, 110, 112, 114, 116, 118, 120, 122, 124, 126, 128 or 130 is required. In an illustrative embodiment, a batch run (which knows it requires several tape drives) requests additional tape drive resource in an outstanding message. After STDM 160 satisfies the outstanding message request, the batch job may proceed. Manual keyins are also available to the operator to perform a tape drive re-assignment with a single, simple keyin.

STDM 160 keeps track of tape drive status for each computer system 102, 104 and 106, and determines which computer system has the most available drives 108 108, 110, 112, 114, 116, 118, 120, 122, 124, 126, 128 or 130. Available drives are chosen from a pool of participating resources which may be un-assigned on one system and re-assigned on another. Entire systems and tape drives may be excluded from this pool, and more than one pool may exist. Within these constraints, STDM 160 orchestrates the movement of tape drives 108, 110, 112, 114, 116, 118, 120, 122, 124, 126, 128 and 130 from where they are not currently needed to wherever there is a need. In essence, STDM 160 automatically takes the actions a typical operator would take in performing a dynamic shared tape drive move from one system to another. All actions are logged, so an audit trail of events is available for historical reference and statistics gathering.

Figure 2:
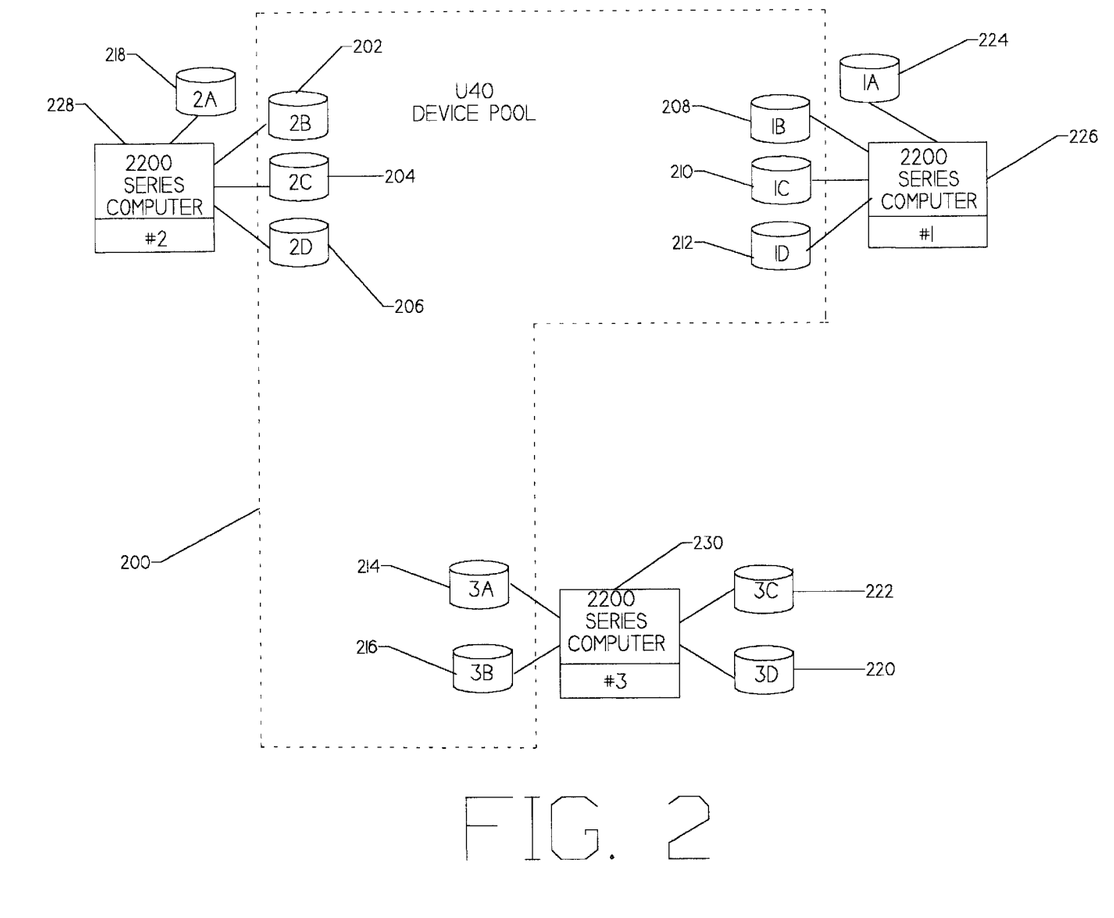
FIG. 2 is a block diagram example of a shared device pool within the present invention.

FIG. 2 is a block diagram example of a shared device pool 200 in accordance with the present invention. A shared device pool 200 organizes available peripheral devices, such as tape drives 202, 204, 206, 208, 210, 212, 214, 216, 218, 220, 222, and 224 into logical groups. In an illustrative embodiment, the pool may represent all tape drives in a particular robotic Cartridge Library Unit (CLU). Multiple pools may exist for multiple CLUs, to present a system without access to a CLU from requesting a tape drive from the CLU. Tape drive types may also be designated by multiple pools 200. For instance, all open reel tapes may be grouped by a "u28" pool, whereas cartridge tapes could be grouped by a "u40" or "u47m" pool. Tape pools 200 determine which host computers 226, 228 and 230 may access which drives of a certain drive type.

To prevent all tape drives from potentially migrating off a system, some tape drive units 218, 220, 222 and 224 may be left outside the pools 200. This ensures STDM 160 will not leave a host computer 226, 228, and 230 without tape drives, a situation which could lead to batch jobs aborting when they require tape access. In another embodiment, STDM keyins can be used to disable one drive on each host computer. This technically keeps the drive in the shared device pool 200, but prevents STDM 160 from re-assigning the tape drive to another system. In yet another embodiment, the tape drive can be reserved through 2200 console keyins.

In a preferred embodiment, the pool 200 defined by STDM 160 fulfills the following requirements: 1) each of the drives in a pool 200 must be equally accessible from each OS 2200 system using the pool 200; 2) the tape drives in a particular pool 200 must be of the same device type; 3) the tape drives must have the same exec device names on all of the OS 2200 systems sharing the pool 200; and 4) tape drives in a pool utilizing Cartridge Tape Library (CTL) units must have equal access to the same tape media within the CTL. A pool 200 many not span multiple CTLs without a pass through capability.

Tape drives 202, 204, 206, 208, 210, 212, 214, 216, 218, 220, 222, and 224 re-assigned manually by the operator but not removed from the pool 200 will remain on the computer system 226, 228 or 230 where they are re-assigned until the need for drives on another system causes the automation to select these drives when they are available. That is, manual re-assignment of drives 202, 204, 206, 208, 210, 212, 214, 216, 218, 220, 222, and 224 does not affect its membership in the pool 200.

The automatic allocation can be turned on or off for any or all of the systems 226, 228 and 230 via a keyin entered by an operator at one of the system consoles of the pool systems 226, 228 and 230, or at the SPO Console display 140. When the automation is disabled on a computer system 226, 228 and 230, any pool drives currently assigned on that computer system 226, 228 and 230 will no longer be available to the other computer systems within the data processing complex via automation. The operator can manually un-assign the pool drives on the computer system 226, 228 or 230 and assign the tape drives on one of the other computer systems to return them to an available status within the pool 200.

Within STDM 160 (see FIG. 1), tape pools 200 are created by the Drive Manager Configuration Utility (shown in FIG. 3 and hereinafter called drivemanc). The user calls this utility as an initial configuration step, or to change the pool information at a later time. As an example, drivemanc may be called as follows to create five tape pools 200:

drivemanc -c clu0 drivemanc -c clu1 drivemanc -c u40 drivemanc -c u47m drivemanc -c u28

Following each call to drivemanc, the user is prompted for the host computers 226, 228 and 230 which can request drives from this pool 200. Next the user is asked which tape drives 202, 204, 206, 208, 210, 212, 214, 216, 218, 220, 222, and 224 belong to each pool 200. Each drivemanc execution creates new or accesses existing STDM tape pool configuration files, as shown in FIG. 3.

Figure 3:
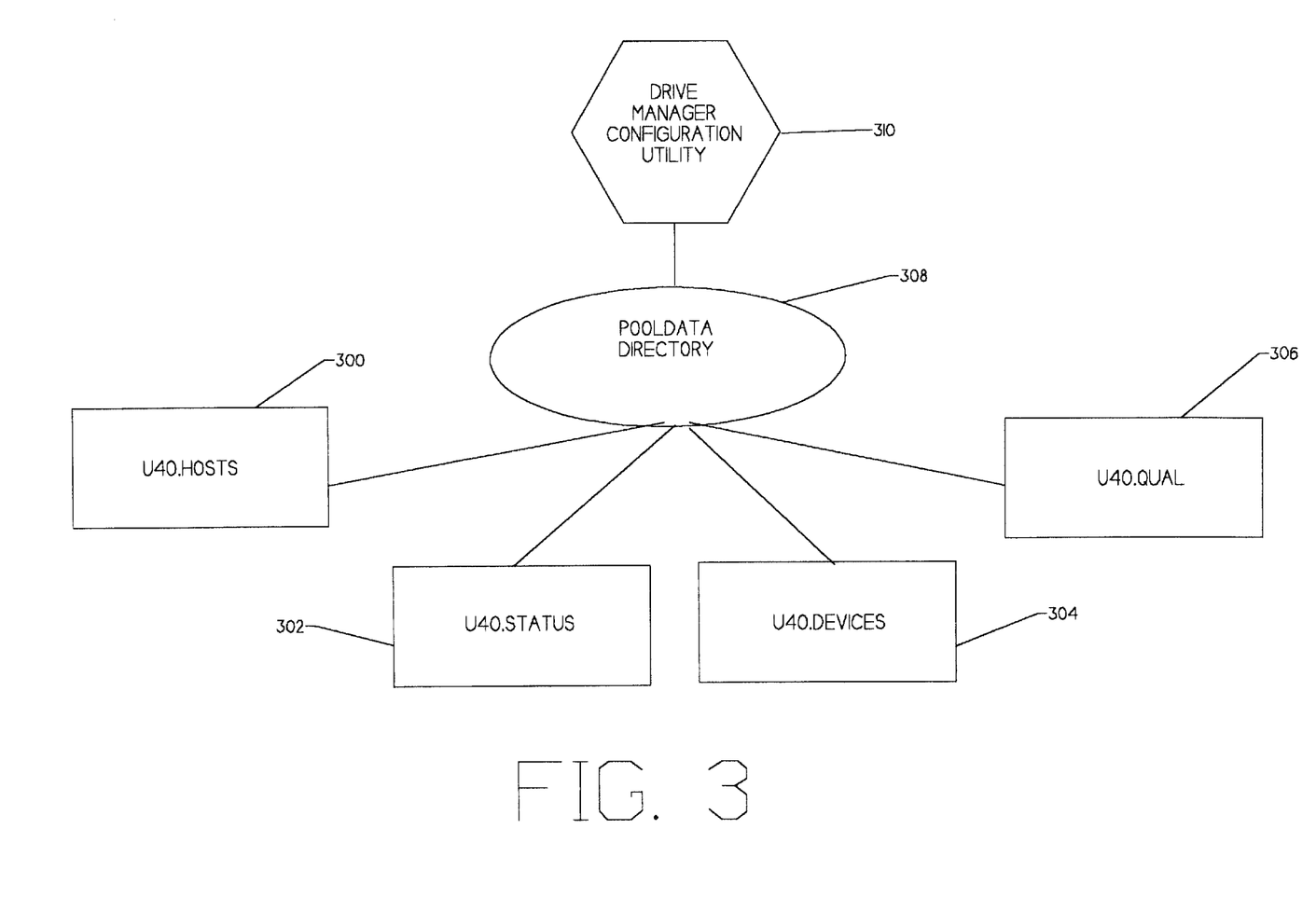
FIG. 3 is a hierarchical block diagram representation of the data files that make up a shared device pool.

FIG. 3 is a hierarchical block diagram representation of the data files 300, 302, 304 and 306 that make up a shared device pool 200. Every drivemanc execution creates new or accesses existing STDM tape pool configuration files 300, 302, 304 and 306. An STDM tape pool 200 comprises four separate but related files: pool.hosts, pool.status, pool.devices, and pool.qual, where "pool" is the name of a configured pool. In the examples presented in FIG. 2, 20 configuration files would be created: u40.hosts 300, u40.status 302, u40.devices 304, and u40.qual 306 for the u40 pool 200, with 16 other files resulting for the remaining pools, clu0, clu1, u47m, and u28. A directory called pooldata 308 is automatically created by the Drive Manager Configuration Utility (drivemanc) 310 in the directory from which it is run. This pooldata directory 308 is also where drivemanc expects to find the pool data files 300, 302, 304 and 306, unless a special environment variable is used to direct it elsewhere.

The drivemanc utility 310 is straightforward to use. Beyond initial configuration, as described above, drivemanc 310 may be used to edit existing pool files 302, 304 and 306, list their contents, and add or remove devices and hosts. In a preferred embodiment, the drivemanc utility 310 provides the following options when it is called without parameters:

drivemanc -a -d device -p pool (Add a device to a pool)

drivemanc -a -h host -p pool (Add a host to a pool)

drivemanc -c [-p pool] (Create a new tape pool)

drivemanc -e [-p pool] (edit an existing tape pool)

drivemanc -l [-p pool] (list hosts/devices in pool)

drivemanc -r -d device -p pool (remove a device)
drivemanc -r -h host -p pool (remove a host)

Figure 4:
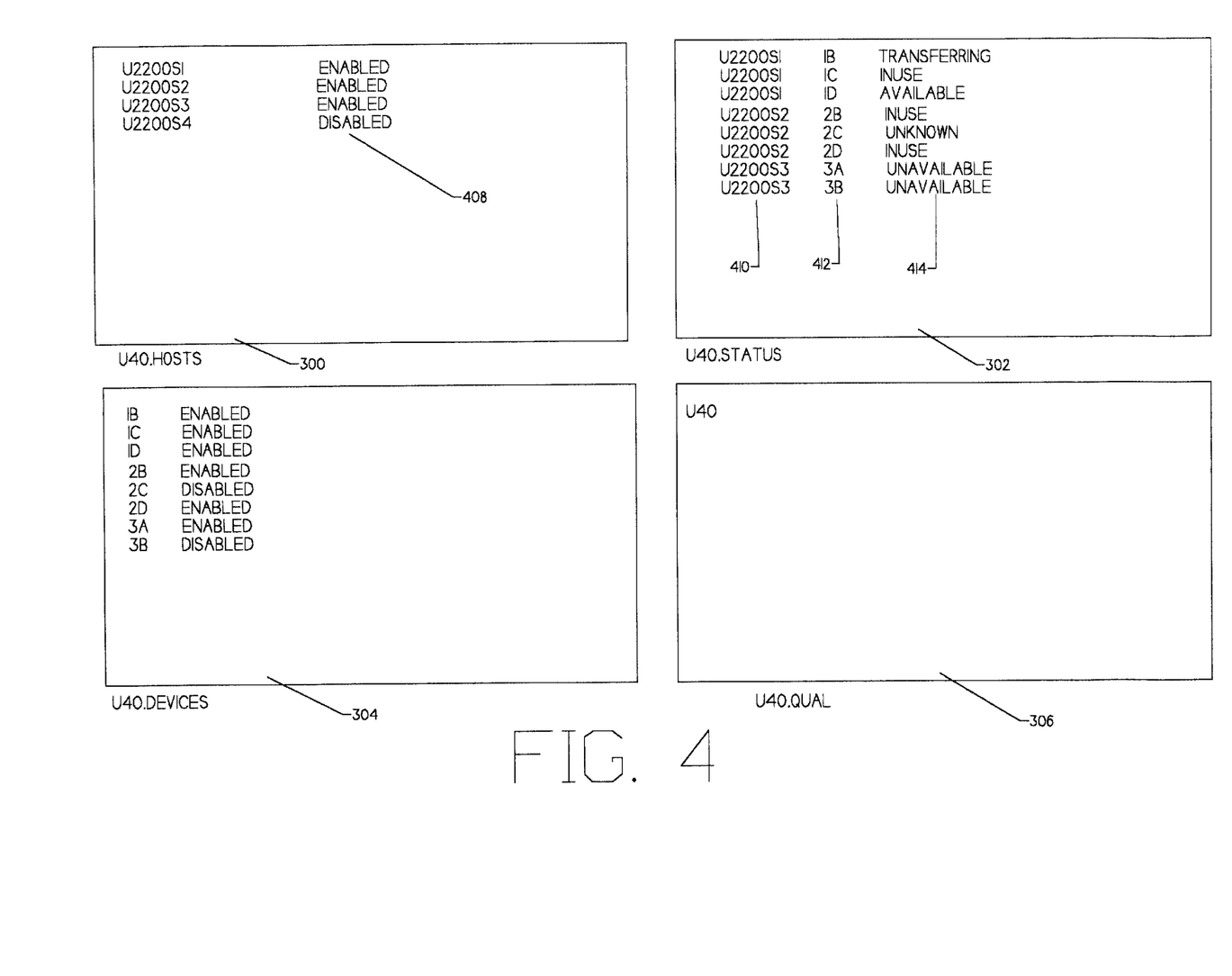
FIG. 4 is an illustrative example of the contents and data organization of the four main data files that comprise a shared device pool description.

FIG. 4 is an illustrative example of the contents and data organization of the four main data files 300, 302, 304 and 306 of a shared device pool description. The first pool file created by the drivemanc utility is the pool.hosts (or, in the illustrated embodiment u40.hosts) file 300. This file 300 lists the host computers which have access to the tape drives in this particular pool, and whether the host computers have been enabled or disabled to STDM 160. In the illustrated embodiment, the operator may have purposely disabled the system U2200S4 from STDM actions 408.

Entire hosts or individual tape drives may be disabled manually when required. The pool.hosts (u40.hosts) file 300 is used to disable hosts, while the pool.devices (u40.devices) file 304 allows for the disabling of individual tape drives. This example illustrates how STDM 160 decides which computer systems it can interact with to re-assign tapes of a certain type.

As mentioned above, the second pool file created by the drivemanc utility is the pool.devices (or, in the illustrated embodiment, u40.devices) file 304. This file 304 lists all of the tape drives in this pool, and whether the drives are enabled or disabled. As noted above, operators may perform manual keyins to disable individual tape drives from STDM 160 use. Until these units are again enabled, STDM 160 will not consider the drive in its allocation decisions.

The third pool file created by the drivemanc utility is the pool.status (or, in the illustrated embodiment, u40.status) file 302. This file 302 describes the available, unavailable, inuse, unknown, or in-transition status of each tape drive on each system for this pool. STDM uses this real-time information as a basis for its drive reallocation decisions. In the illustrative embodiment, column one 410 of the u40.status file contains the host name, column two 412 contains the drive name, and column three 414 contains the current status of the drive. This matrix of hosts, tape drives, and their associated state is updated as actual conditions change within the data processing complex. STDM 160 uses the information in this file to determine which host has the most available tape drives.

The fourth file created by the drivemanc utility is the pool.qual (or, in the illustrated embodiment, u40.qual) file 306. This file 306 contains only the pool qualifier name, if used to further qualify pool devices. Some sites may require pool qualifiers to represent tape drive connectivity restrictions. In this example (pool qualifiers are not in use) the u40.qual file simply contains "U40".

Figure 5:
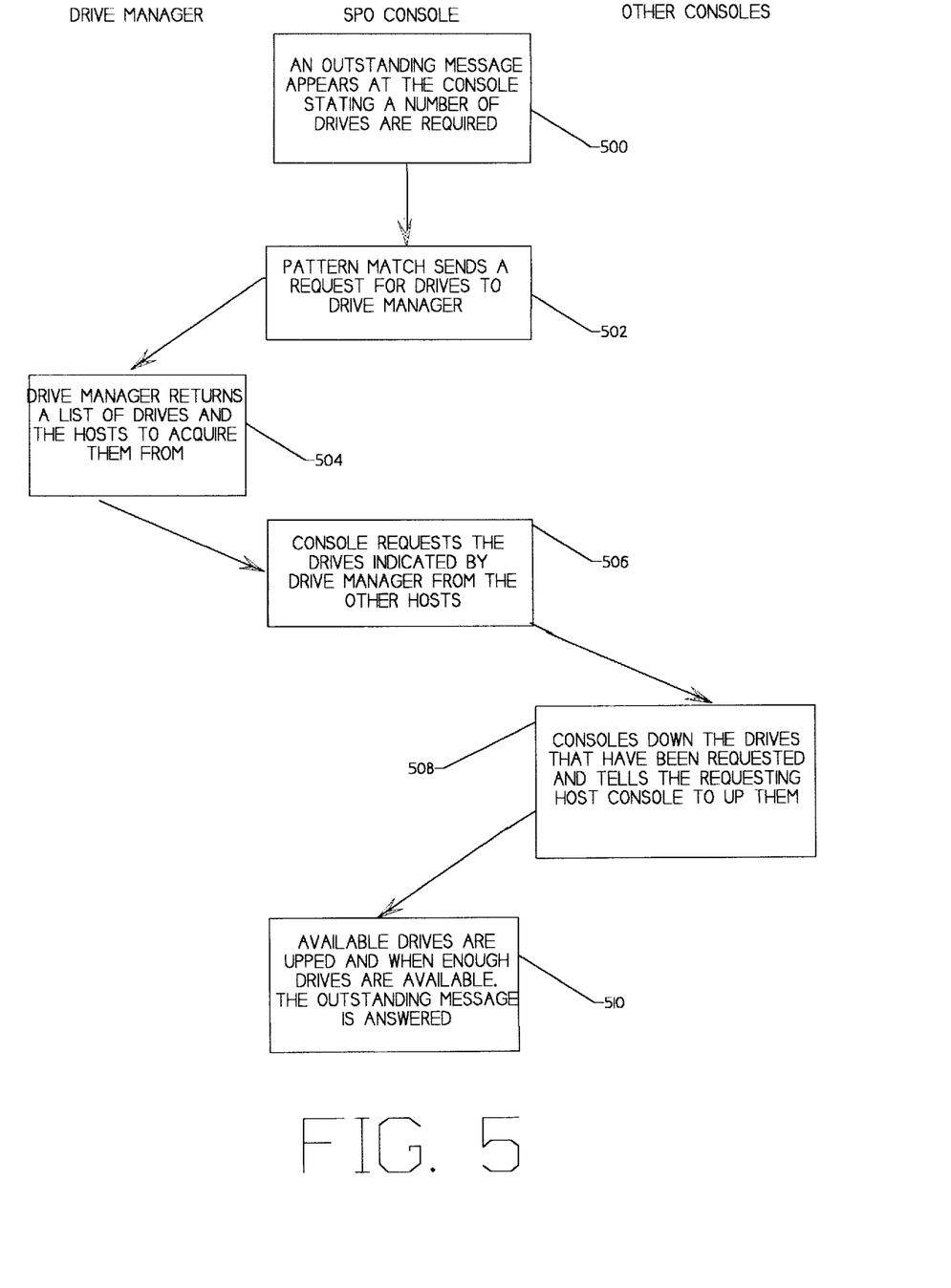
FIG. 5 is a flow diagram representing the process by which an additional peripheral resource is requested and fulfilled by the present invention.

FIG. 5 is a flow diagram representing the process by which an additional peripheral resource request is serviced by the present invention. This process begins when a host system requires an additional tape drive resource, and an outstanding message appears at the SPO Console (FIG. 1, 132) stating that a number of drives are required 500. The most straightforward method to request additional tape drive resource is for 2200 batch or demand runs to send a message to the SPO Console (FIG. 1, 132) through a cross system automation component such as the Single Point Autoaction Message System (SP-AMS), available from Unisys Corporation. In a preferred embodiment, the following message is an example of a message which could initiate the STDM drive acquisition process:

@MSG,W STDM <pool><number-of-tapes-required><tape #>The first field ("STDM") is for ease of message matching. The second field (tape pool to use) is the only other required field. Users could ask for a specific number of tapes to acquire at once, or serialize the process by using this @MSG,W message repeatedly whenever tape drives are needed. The tape number to be used is completely optional, and is only listed in the message for operator information. This message ensures the run is held until enough tape drives are made available through STDM 160. This message is automatically answered when STDM 160 is sure enough tape drives are available.

After an outstanding message appears at the SPO Console (FIG. 1, 132) stating that a number of drives are required 500, a pattern matching utility within the SPO Console (FIG. 1, 132) then sends a request for tape drive resource to the drive manager component of STDM 502. For A Series, UNIX and various other systems, message automation is provided by the Single Point Autoaction Message System (SP-AMS) component of the SPO Console. For 2200 Series computers, SPO Console (FIG. 1, 132) works in conjunction with the SMART operator message automation capability which runs on the PC console of the 2200 system.

The message automation portion of the SPO Console (FIG. 1, 132) is controlled by rules contained in a database of message patterns and corresponding actions. Defining the pattern to match a message can be as simple as selecting a portion of the message text that must match or specifying a value such that the identity of the job that sent the message. For more complex message handling, full pattern matching capabilities are provided. In a preferred embodiment, the message automation will key on the STDM portion of the message in order to identify the message as a resource request for the shared tape device manager.

As mentioned earlier, after the message is received by the SPO Console (FIG. 1, 132), and has been properly identified and handled by message automation, the pattern matching component of the message automation then sends a request for drives to the STDM shell script 502, which is running in a SPO telnet session. Cross system automation event reports are used to communicate with this script. The STDM then examines its tape drive availability database, and selects a system which has the most free pool devices. STDM 160 then returns to the SPO Console (FIG. 1, 132) a list of drives and the hosts to acquire them from 504.

The SPO Console (FIG. 1, 132) then requests the drives identified by the drive manager from their corresponding hosts 506. STDM 160 asks the host to un-assign the drive and waits for a response. If no response is received or the operation cannot be completed, another device and/or system is chosen. Once a drive has been un-assigned successfully on a system, STDM 160 instructs the requesting system to assign the drive 508. If this is successful (the available drives have been assigned), the outstanding message is answered, and additional requests may be processed 510. If unsuccessful, an alert is raised to the operator console. The drives used in the pool will remain available to the system that last used the drive. The automation will not balance the pool devices across the systems, it will only act when the need for a tape drive is established.

Figure 6:
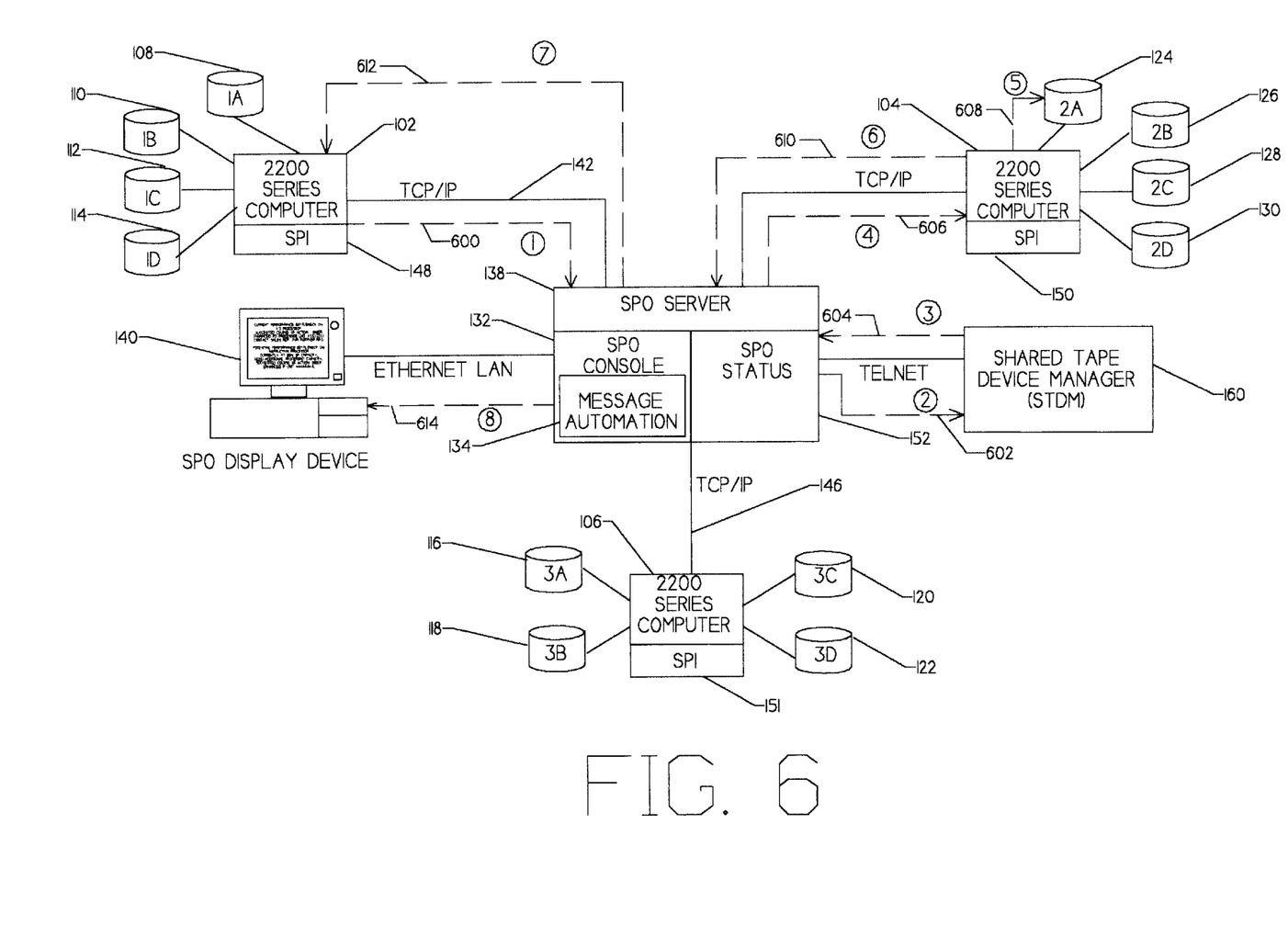
FIG. 6 is a block diagram of the computer-based environment of the present invention, along with process flow arrows showing a typical device request generated by a host system.

FIG. 6 is a block diagram of the computer-based environment of the present invention, along with process flow arrows showing a typical device request generated by a host system. In step 1 of the process, a batch run executing on a Unisys 2200 series computer 102 requests an additional tape drive resource in order to complete successfully 600. The 2200 series batch run then sends a message to the SPO Server 138 via a TCP/IP connection 142 notifying the SPO Console 132 of the request for additional tape drive resource. A pattern matching component of the SPO Console 132 message automation facility identifies the message as a request for additional tape drive resource, and communicates this request to the Shared Tape Device Manager (STDM) 160, as shown in step 2 of the process 602.

The controlling STDM Unix shell script executes in a read-only SPO telnet session 154, which is automatically logged in to the SPO Server 138 and waiting for input. STDM 160 then examines its tape drive availability database, and selects a host data processing system 104 which has the most free pool devices. In step 3 of the process 604, the STDM 160 then notifies the SPO Console 132 of identified tape drive resources 124 on associated host data processing systems which are available to fulfill the request.

In step 4 of the process 606, a request is sent to the host data processing system 104 holding the identified available tape drive resource 124 to un-assign the tape drive resource 124. In step 5 of the process 608, the host data processing system 104 attempts to un-assign the identified available tape drive resource 124. If no response is received from the host data processing system 104, or the un-assignment operation cannot be completed, another tape drive resource and/or host data processing system is chosen.

In step 6 of the process 610, after a tape drive resource 124 has been un-assigned successfully on a host data processing system 104, The SPO Console 132 and STDM 160 are notified. If unsuccessful, an alert is raised to the operator console.

In step 7 of the process 612, STDM 160, through the SPO Console 132, then notifies the requesting host computer system 102 to assign the available tape drive resource 124. If this operation is successful, the process is complete and additional requests may be processed. If unsuccessful, an alert is raised to Operations.

In step 8 of the process 614, SP-Status 152 displays the newly updated changes to tape drive availability and assignments to the SPO Console display device 140.

Having thus described the preferred embodiment of the present invention, those of skill in the art will readily appreciate the many additional embodiments which may be implemented using the teachings found herein and within the scope of the claims hereto attached.

What is claimed is:

1. An apparatus for the automated management of peripheral devices of a data processing complex, the data processing complex having one or more data processing systems and one or more peripheral devices comprising:
   a. shared device manager means for coordinating the management of shared peripheral devices;
   b. grouping means within said shared device manager means for organizing the peripheral devices assigned to a host system into one or more pools of shared devices;
   c. notification means by which a requesting data processing system issues a request to said shared device manager means that an additional resource of said peripheral devices is required;
   d. allocation means by which said shared device manager means receives said request from said notification means, selects one or more peripheral devices from said pools, and allocates the selected peripheral devices to the requesting data processing system;
   e. configuration means by which said shared device manager means automatically assigns the selected peripheral devices to the requesting data processing system; and
   f. wherein said data processing complex further comprises one or more Unisys 2200 series managed systems, a UNIX based Single Point Operations (SPO) Server, one or more large screen SPO display devices connected to said SPO Server via an Ethernet LAN, a TCP/IP network connecting said SPO Server and each of said managed systems, SPO Console software residing on said SPO Server to display, monitor and control the operation of said managed systems, Single Point Interface (SPI) software residing on one or more of said managed systems, connecting each of said managed systems with said SPO Console, one or more tape drives connected to said managed systems, Shared Tape Drive Manager (STDM) software running in a SPO Telnet session on said SPO Server, SPO Status software for dynamically representing which of said peripheral devices are assigned to which of said data processing systems, and Single Point Autoaction Message System (SP-AMS) software to process operator messages received from said managed systems.

2. An apparatus according to claim 1 wherein said Single Point Operations (SPO) Server is selected from the group consisting of an Aquanta server running UnixWare, a U6000 server running SVR4, and a Sun SPARC server running Solaris.

3. An apparatus for the automated management of peripheral devices of a data processing complex, the data processing complex having one or more data processing systems and one or more peripheral devices comprising:
   a. shared device manager means for coordinating the management of shared peripheral devices;
   b. grouping means within said shared device manager means for organizing the peripheral devices assigned to a host system into one or more pools of shared devices;
   c. notification means by which a requesting data processing system issues a request to said shared device manager means that an additional resource of said peripheral devices is required;
   d. allocation means by which said shared device manager means receives said request from said notification means, selects one or more peripheral devices from said pools, and allocates the selected peripheral devices to the requesting data processing system;
   e. configuration means by which said shared device manager means automatically assigns the selected peripheral devices to the requesting data processing system; and
   f. wherein said grouping means further comprises a peripheral management means which initially configures said pools of shared devices, edits said pools of shared devices, lists the contents of said pools of shared devices, and adds or removes said shared devices.

4. An apparatus for the automated management of peripheral devices of a data processing complex, the data processing complex having one or more data processing systems and one or more peripheral devices comprising:
   a. shared device manager means for coordinating the management of shared peripheral devices;
   b. grouping means within said shared device manager means for organizing the peripheral devices assigned to a host system into one or more pools of shared devices;
   c. notification means by which a requesting data processing system issues a request to said shared device manager means that an additional resource of said peripheral devices is required;
   d. allocation means by which said shared device manager means receives said request from said notification means, select one or more peripheral devices from said pools, and allocates the selected peripheral devices to the requesting data processing system;

e. configuration means by which said shared device manager means automatically assigns the selected peripheral devices to the requesting data processing system; and f. wherein one or more of said devices re-assigned manually by a computer operator to a first system but not removed from said pools remains on said first system until the need for a new device on a second system causes said shared device manager to select said devices of said first system when said devices become available.

5. An apparatus for the automated management of peripheral devices of a data processing complex, the data processing complex having one or more data processing systems and one or more peripheral devices comprising:

a. shared device manager means for coordinating the management of shared peripheral devices;

b. grouping means within said shared device manager means for organizing the peripheral devices assigned to a host system into one or more pools of shared devices;

c. notification means by which a requesting data processing system issues a request to said shared device manager means that an additional resource of said peripheral devices is required;

d. allocation means by which said shared device manager means receives said request from said notification means, selects one or more peripheral devices from said pools, and allocates the selected peripheral devices to the requesting data processing system;

e. configuration means by which said shared device manager means automatically assigns the selected peripheral devices to the requesting data processing system; and f. wherein said notification means further comprises a messaging means for sending a message alerting a tape hold condition to a system console of a data processing system.

6. An apparatus for the automated management of peripheral devices of a data processing complex, the data processing complex having one or more data processing systems and one or more peripheral devices comprising:

a. shared device manager means for coordinating the management of shared peripheral devices;

b. grouping means within said shared device manager means for organizing the peripheral devices assigned to a host system into one or more pools of shared devices;

c. notification means by which a requesting data processing system issues a request to said shared device manager means that an additional resource of said peripheral devices is required;

d. allocation means by which said shared device manager means receives said request from said notification means, selects one or more peripheral devices from said pools, and allocates the selected peripheral devices to the requesting data processing system;

e. configuration means by which said shared device manager means automatically assigns the selected peripheral devices to the requesting data processing system; and f. wherein said notification means further comprises a messaging means for sending a device request to a system console of said data processing system from a batch procedure.

7. An apparatus for the automated management of peripheral devices of a data processing complex, the data processing complex having one or more data processing systems and one or more peripheral devices comprising:

a. shared device manager means for coordinating the management of shared peripheral devices;

b. grouping means within said shared device manager means for organizing the peripheral devices assigned to a host system into one or more pools of shared devices;

c. notification means by which a requesting data processing system issues a request to said shared device manager means that an additional resource of said peripheral devices is required;

d. allocation means by which said shared device manager means receives said request from said notification means, selects one or more peripheral devices from said pools, and allocates the selected peripheral devices to the requesting data processing system;

e. configuration means by which said shared device manager means automatically assigns the selected peripheral devices to the requesting data processing system; and f. wherein said allocation means further comprises a message matching means which interprets said device request displayed on said system console, and issues a request for a set of available peripheral devices to said device manager means.

8. An apparatus according to claim 7 wherein said allocation means further comprises an analysis means which examines a peripheral device availability database, and builds the set of available peripherals to satisfy said request from said data processing systems having the most free peripheral devices.

9. An apparatus for the automated management of peripheral devices of a data processing complex, the data processing complex having one or more data processing systems and one or more peripheral devices comprising:

a. shared device manager means for coordinating the management of shared peripheral devices;

b. grouping means within said shared device manager means for organizing the peripheral devices assigned to a host system into one or more pools of shared devices;

c. notification means by which a requesting data processing system issues a request to said shared device manager means that an additional resource of said peripheral devices is required;

d. allocation means by which said shared device manager means receives said request from said notification means, selects one or more peripheral devices from said pools, and allocates the selected peripheral devices to the requesting data processing system;

e. configuration means by which said shared device manager means automatically assigns the selected peripheral devices to the requesting data processing system; and f. wherein said configuration means further comprises an automated un-assignment of said peripheral devices on corresponding host data processing systems, and an assignment of said peripheral devices on said requesting data processing systems.

10. An apparatus according to claim 9 wherein said configuration means further has a messaging means for sending a request to said shared device manager means to un-assign said selected peripheral on said corresponding host data processing system, and if no response is received or said request cannot be completed, another said device is chosen.

11. An apparatus according to claim 10 wherein after said selected peripheral device has been un-assigned, said device manager instructs said requesting data processing system to assign said peripheral device.

12. An apparatus according to claim 11 wherein if said peripheral device cannot be successfully assigned, an alert message is sent to an operator console.

13. An apparatus for the automated management of peripheral devices of a data processing complex, the data processing complex having one or more data processing systems and one or more peripheral devices comprising:
   a. shared device manager means for coordinating the management of shared peripheral devices;
   b. grouping means within said shared device manager means for organizing the peripheral devices assigned to a host system into one or more pools of shared devices;
   c. notification means by which a requesting data processing system issues a request to said shared device manager means that an additional resource of said peripheral devices is required;
   d. allocation means by which said shared device manager means receives said request from said notification means, selects one or more peripheral devices from said pools, and allocates the selected peripheral devices to the requesting data processing system;
   e. configuration means by which said shared device manager means automatically assigns the selected peripheral devices to the requesting data processing system; and
   f. wherein said peripheral devices in said pools remain available to the last of said data processing systems that used said peripheral device.

14. An apparatus according to claim 13 wherein a computer operator can return said peripheral devices on said selected data processing system to an available status within said pools by manually un-assigning said peripheral device on said selected data processing system and manually assigning the drive on another said data processing system where said shared device manager means is active.

15. An apparatus for the automated management of peripheral devices of a data processing complex, the data processing complex having one or more data processing systems and one or more peripheral devices comprising:
   a. shared device manager means for coordinating the management of shared peripheral devices;
   b. grouping means within said shared device manager means for organizing the peripheral devices assigned to a host system into one or more pools of shared devices;
   c. notification means by which a requesting data processing system issues a request to said shared device manager means that an additional resource of said peripheral devices is required;
   d. allocation means by which said shared device manager means receives said request from said notification means, selects one or more peripheral devices from said pools, and allocates the selected peripheral devices to the requesting data processing system;
   e. configuration means by which said shared device manager means automatically assigns the selected peripheral devices to the requesting data processing system; and
   f. wherein said shared device manager means further comprises an archival means for recording said automated management of said peripheral devices in a history file for later reference.

16. An apparatus for the automated management of peripheral devices of a data processing complex, the data processing complex having one or more data processing systems and one or more peripheral devices comprising:
   a. shared device manager means for coordinating the management of shared peripheral devices;
   b. grouping means within said shared device manager means for organizing the peripheral devices assigned to a host system into one or more pools of shared devices;
   c. notification means by which a requesting data processing system issues a request to said shared device manager means that an additional resource of said peripheral devices is required;
   d. allocation means by which said shared device manager means receives said request from said notification means, selects one or more peripheral devices from said pools, and allocates the selected peripheral devices to the requesting data processing system;
   e. configuration means by which said shared device manager means automatically assigns the selected peripheral devices to the requesting data processing system; and
   f. wherein said shared device manager means can be activated or disabled for a selected data processing system via a keyin sequence entered by a computer operator at a computer console on said selected data processing system.

17. An apparatus according to claim 16 wherein if said shared device manager means is disabled on said selected data processing system, any of said peripheral devices on said selected data processing system assigned to said pools of shared devices are not available to other said data processing systems.

18. An apparatus for the automated management of tape drives of a data processing complex, the data processing complex having one or more data processing systems and one or more tape drives comprising:
   a. shared tape drive manager means for coordinating the management of shared tape drives;
   b. grouping means within said shared tape drive manager means for organizing the tape drives assigned to a host system into one or more pools of shared tape drives;
   c. notification means by which a requesting data processing system issues a request to said shared tape drive manager means that an additional resource of said tape drives is required;
   d. allocation means by which said shared tape drive manager means receives said request from said notification means, selects one or more tape drives from said pools, and allocates the selected tape drives to the requesting data processing system;
   e. configuration means by which said shared tape drive manager means automatically assigns the selected tape drives to the requesting data processing system;
   f. display means for displaying a dynamically updated status of the current allocations of said tape drives to said data processing systems; and
   g. archival means for archiving the automatic tape drive management activities in a history file for future reference.

19. A method for managing peripheral devices of a data processing complex, the data processing complex having one or more data processing systems and one or more peripheral devices comprising:
   a. grouping one or more of said peripheral devices assigned to a host system into one or more pools of shared devices, wherein said pools of shared devices are created and maintained by a peripheral device configuration means which, in addition to defining an initial configuration of said pools of shared devices, may also be used to edit existing pool files, list the contents of said pools, and add or remove said peripheral devices from said pools;

b. monitoring said data processing complex for requests for additional peripheral device resources;

c. matching said requests for said additional peripheral device resources against available resources in said pools of shared devices; and d. assigning said available resources in said pools of shared devices to service said requests.

20. The method according to claim 19 wherein said peripheral device configuration means stores a dynamic configuration for said pools in a series of pool configuration files located within said data processing complex.

21. The method according to claim 20 wherein said set of pool configuration files includes a file listing which of said data processing systems have access to said peripheral devices in said pool and whether said data processing systems have been enabled or disabled to said peripheral device management means.

22. The method according to claim 20 wherein said set of pool configuration files includes a file showing the available, unavailable, in use, unknown, or in-transition status of each said peripheral device on each said data processing system.

23. The method according to claim 20 wherein said set of pool configuration files includes a file which lists all said peripheral devices in each of said pools, and whether said peripheral devices are enabled or disabled.

24. The method according to claim 20 wherein said set of pool configuration files includes a file which is used to further qualify said peripheral devices within said pools to further identify peripheral device connectivity restrictions.

25. The method according to claim 19 wherein said monitoring utilizes the Single Point Operations (SPO) Console, available commercially from Unisys Corporation, to intercept, interpret, and manage requests for additional peripheral device resources.

26. The method according to claim 25 wherein said requests for additional peripheral device resources are communicated to said SPO through a cross system automation facility.

27. The method according to claim 26 wherein said cross system automation facility comprises the Single Point Autoaction Message System (SP-AMS) component of said SPO Console.

28. The method according to claim 19 wherein said matching of said request for said additional peripheral devices resources is done by a shared peripheral device manager facility.

29. The method according to claim 28 wherein said shared peripheral device manager facility evaluates the peripheral device status information from each said data processing system, determines which of said data processing systems has free peripheral devices available for use, and requests the appropriate reconfiguration of said shared peripheral devices from each of said data processing systems.

30. The method according to claim 29 wherein said shared peripheral device manager facility is a Unix shell script executing in a read-only SPO telnet session.

31. The method according to claim 30 wherein said shared peripheral device manager facility manages only tape drives in a Unisys 2200 data processing complex.

32. The method according to claim 19 wherein said assigning of said available resources in said pools of shared devices to service said request further comprises the automated un-assignment of said peripheral devices on corresponding host data processing systems, and the assignment of said peripheral devices on said requesting data processing systems.

33. A method for managing the peripheral devices of a data processing complex, the data processing complex having one or more data processing systems and one or more peripheral devices comprising:

a. grouping one or more of said peripheral devices assigned to a host system into one or more pools of shared devices;

b. managing said pools though a peripheral device configuration means;

c. monitoring said data processing complex for requests for additional peripheral device resources;

d. matching said requests for said additional peripheral devices resources against available resources in said pools of shared devices;

e. assigning said available resources in said pools of shared devices to service said request;

f. displaying a dynamically updated status of the current allocations of said peripheral devices to said data processing systems; and g. archiving the automatic peripheral device management activities in a history file for further reference.

34. A method of managing the tape drive devices of a data processing complex, the data processing complex having one or more data processing systems and one or more tape drives comprising:

a. grouping one or more tape drives assigned to said data processing systems into one or more pools of shared tape drives;

b. managing said pools through a shared tape drive manager (STDM) utility;

c. monitoring said data processing complex for requests for additional tape drives;

d. matching said requests for said additional tape drive resources against available resources in said pools of tape drives;

e. assigning said available resources in said pools of tape drives to service said request;

f. displaying a dynamically updated status of the current allocations of said tape drives to said data processing systems; and g. archiving the tape drive management activities in a history file for further reference.

35. The method according to claim 34 wherein said data processing complex comprises one or more Unisys 2200 series mainframe computers.

36. The method according to claim 35 wherein said monitoring utilizes the Single Point Operations (SPO) Console, available commercially from Unisys Corporation, to intercept, interpret, and manage requests for additional tape drive resources.

37. The method according to claim 36 wherein a minimum SPO console configuration comprises a SPO server, one or more large screen display devices, TCP/IP network connections between said SPO Server and each managed data processing system, SPO Console software to run on the SPO Server, and Single Point Interface software for each managed system.

38. The method according to claim 37 wherein said Single Point Operations (SPO) Server is selected from the group consisting of an Aquanta server running UnixWare, a U6000 server running SVR4, and a Sun SPARC server running Solaris.

39. The method according to claim 34 wherein said Shared Tape Drive Manager (STDM), in addition to defining an initial configuration of said pools, may also be used to edit existing pool files, list the contents of said pools, and add or remove said peripheral devices from said pools.

40. The method according to claim 34 wherein each said tape drives within each of said pools are of the same device type.

41. The method according to claim 34 wherein said requests for additional tape drive resources are communicated to said SPO through a cross system automation facility.

42. The method according to claim 34 wherein said monitoring further comprises a messaging means wherein a batch procedure sends a tape drive request to a system console of said data processing system.

43. The method according to claim 34 wherein said matching further comprises a message matching means which interprets said tape drive request displayed on said system console, and issues a request for a set of available peripheral devices to said Shared Tape Drive Manager (STDM).

44. The method according to claim 43 wherein said matching further comprises an analysis means which examines a tape drive availability database, and builds a set of available tape drives to satisfy said request from said data processing systems having the most free tape drives.

45. The method according to claim 34 wherein said assigning further comprises the automated un-assignment of said tape drives on corresponding host data processing systems, and the assignment of said tape drives on said requesting data processing systems.

46. The method according to claim 45 wherein said assigning further comprises said Shared Tape Drive Manager (STDM) sending a request to un-assign a selected tape drive on said corresponding host data processing system, and if no response is received or said request cannot be completed, another said tape drive is chosen.

47. The method according to claim 46 wherein after said selected tape drive has been un-assigned, said Shared Tape Drive Manager (STDM) instructs said requesting data processing system to assign said tape drive.

48. The method according to claim 34 wherein said tape drives in said pools remain available to the last of said data processing systems that used said tape drive.

49. The method according to claim 34 wherein said Shared Tape Drive Manager facility is a Unix shell script executing in a read-only SPO telnet session.

50. An apparatus according to claim 34 wherein if said tape drives in said pools comprise Cartridge Tape Library (CTL) units, said CTL units must have equal access to the same tape media within the CTL, and each of said pools may not span more than one of said CTLs without a pass through capability.

* * * * *